United States Patent [19]
Yoshino et al.

[11] Patent Number: 5,696,836
[45] Date of Patent: Dec. 9, 1997

[54] MOTION ESTIMATION PROCESSOR ARCHITECTURE FOR FULL SEARCH BLOCK MATCHING

[75] Inventors: Toshiaki Yoshino, Fremont; King Pang, Mountain View, both of Calif.

[73] Assignee: LSI Logic Corporation, Milpitas, Calif.

[21] Appl. No.: 406,017

[22] Filed: Mar. 17, 1995

[51] Int. Cl.$^6$ .............................. G06K 9/00; G06K 9/36; H04N 5/14
[52] U.S. Cl. .......................... 382/107; 382/236; 348/699
[58] Field of Search .................................. 382/107, 236; 348/699

[56] References Cited

U.S. PATENT DOCUMENTS

| | | | |
|---|---|---|---|
| 5,351,095 | 9/1994 | Kerdranvat | 348/699 |
| 5,469,226 | 11/1995 | David et al. | 348/699 |
| 5,568,203 | 10/1996 | Lee | 348/699 |

OTHER PUBLICATIONS

Kun–Min Yang, Ming–Ting Sun and Lancelot Wu, *A Family of VLSI Designs for the Motion Compensation Block–Matching Algorithm*, IEEE Transactions on Circuits and Systems, vol. 36, No. 10, Oct. 1989, pp. 1317–1325.

Yeu–Shen Jehng, Liang–Gee Chen and Tzi–Dar Chiueh, *An Efficient and Simple VLSI Tree Architecture for Motion Estimation Algorithms;* IEEE Transactions on Signal Processing, vol. 41, No. 2, Feb. 1993, pp. 889–899.

Thomas Komarek and Peter Pirsch, *Array Architectures for Block Matching Algorithms*, IEEE Transactions on Circuits and Systems, vol. 36, No. 10, Oct. 1989, pp. 1301–1308.

Baek et al, "A Fast Array Architecture for Block Matching Algorithm", Circuits and Systems, 1994 IEEE International Symposium, vol. 4, 1994.

Chan et al., "Motion Estimation Architecture for Video Compression", IEEE Transactions on Consumer Electronics, vol. 39, No. 3, Aug. 1993.

Hsieh et al, "VLSI Architecture for Block–Matching Motion Estimation Algorithm", IEEE Transactions on Circuits and Systems for Video technology, vol. 2, No. 2, Jun. 1992.

Nam et al, "A VLSI Design for Full Search Block Matching Motion Estimation", ASIC Conference and Exhibit, 1994.

Nam et al, "Flexible VLSI Architecture of Full Search Motion Estimator for Video Applications", IEEE Transactions on Consumer Electronics, vol. 40, No. 2, May 1994.

*Primary Examiner*—Leo Boudreau
*Assistant Examiner*—Bhavesh Mehta
*Attorney, Agent, or Firm*—Oppenheimer Poms Smith

[57] ABSTRACT

A circuit for calculating a sum of absolute errors for use in full block search matching in a motion estimation processor is disclosed herein, the circuit being easily implemented and capable of running at 54 Mhz. The circuit accesses search window and reference data from memory and loads the data into rows of laterally interacting processing elements having an architecture capable of fast data processing. A sum of absolute errors between all elements of each row of search data and all elements of each row of reference data is calculated, and the absolute error for all rows of processing elements is totalled. From this total sum of absolute error, the motion vector may be predicted for the next frame.

25 Claims, 11 Drawing Sheets

MOTION ESTIMATION PROCESSOR ARCHITECTURE FOR FULL SEARCH BLOCK MATCHING

FIELD OF THE INVENTION

This invention relates to motion estimation processors, and more particularly to such processors having full-search block-matching capability.

BACKGROUND OF THE INVENTION

Low bit rate motion video transmission has been applied in teleconferencing and videophone applications over integrated service digital networks (ISDNs). Compression of the video to the necessary low bit rate produces degradation of the picture received. To make video applications available to the public at a relatively low cost with high performance, various techniques have been employed to enhance the picture received. Motion estimation is one frequently used technique for providing high quality video images without incurring substantial increases in the amount of data that must be transmitted. Motion estimation works on the principle that between one frame and the next, the same details are represented with some movement of images occurring. Data compression can be realized if each detail within the picture is represented by its difference with the most similar detail in the previous frame and by a vector expressing the position of the details in the second frame with respect to the first frame. The original details can then be constructed in the new frame based on this information.

Different types of motion estimators exist, but the most popular motion estimator is a full search block matching technique, where the picture is divided into several blocks, and each block is processed individually. For each block, called a reference block, the most similar detail is searched for among the possible blocks having equal size contained in the previous frame, or candidate blocks. The reference block is compared with the candidate block, or search window, and the difference between the two is called the distortion between the two blocks. After all possible candidates are searched, the candidate block having the minimum distortion is chosen, and the displacement or offset between the chosen candidate and the reference is the vector.

Full search block matching entails searching all blocks in the video image and comparing the blocks with the reference blocks, enabling prediction for large changes in position of details within the frame. Distortion may be determined using the sum of absolute error (SAE) between the previous frame detail and present frame detail, and determining the minimum absolute error. SAEs are calculated for full search block matching using the following equation:

$$SAE(x,y) = \sum_{j=0}^{N-1} \sum_{i=0}^{M-1} |SW(i+x, j+y) - REF(i,j)|$$

where x and y represent the displacement (motion vector).

When implementing a full search block matching circuit on an ASIC (application specific integrated circuit), different methods have been employed to optimize the processing element (PE) structures. Systolic mesh architecture, as described in Jehng, et al., *An Efficient and Simple VLSI Tree Architecture for Motion Estimation Algorithms*, IEEE Transactions on Signal Processing, February, 1993, maps the data from the search window onto a series of processing elements. Each individual systolic processing element computes differences between the search data pixels and the reference pixels. A comparator is used to find the block distortion, and its corresponding offset gives the minimum motion vector. The processing elements are "meshed" together, each element interacting with as many as four additional elements. This arrangement unfortunately makes the layout of the array complicated. The reference also proposes a tree architecture, but the irregularity of the design makes it difficult to implement in a highly integrated processing array.

Another method used to calculate the SAE in a real-time motion processor is described in the paper by Yang, et al., *A Family of VLSI Designs for the Motion Compensation Block-Matching Algorithm*, IEEE Transactions on Circuits and Systems, October 1989. In such an architecture, a single processing element computes an SAE which corresponds to a single motion vector. The single processing element architecture is consequently much larger than the systolic mesh-array system since each processing element must accumulate all pixel differences. Data is transferred from the search window memory to the processing element. Additional bit width requires many additional registers to handle data properly in the accumulator, and thus a larger layout is necessary to implement the design. Further, as each processing element in the Yang reference computes a single SAE, reading all the data requires waiting N cycles until the first (and all) SEA are available and the element can begin processing data. Then a determination of the minimum SAE can be preferred.

Accordingly, it is a principle object of this invention to provide a circuit which can process the search window data in a motion estimation processor at a rapid rate and be laid out in a regular highly integrated structure. Faster data processing increases the search range, resulting in a better motion vector. VLSI chips employing full block matching techniques to process search window data have been capable of computing motion vectors for CCIR601 image data format with one chip alone, within a search range ±16 horizontal and ±16 vertical.

A further object of the invention is to provide a simple and compact architecture for processing search window data on a motion estimator ASIC. Search window memory and data acquisition schemes may be well organized to provided maximum capability on the smallest possible portion of an ASIC. Processing element macrocells may also be tightly organized to minimize throughput delay and other layout sizing problems.

Another object of the present invention is to provide flexibility to address different dimensioned search windows, such as 8×8, 4×4, etc., thereby producing flexibility depending on the video application involved. Different application requirements dictate different search window sizes. Thus, depending on the application, an object of the present invention is to provide flexibility to address the needs of the encoder.

SUMMARY OF THE INVENTION

According to the present invention, there is provided a full search block matching motion estimator circuit for calculating a total sum of absolute error which can operate at 54 Mhz clock rate and provides easy implementation at a relatively low cost. The circuit of the present invention may be used for different sized reference windows, and computes the necessary SAEs with little delay in a relatively tight design on the motion processor ASIC.

The present circuit accesses search window and reference data from memory using 8 bit word width. The search window and reference data is partitioned into rows and columns. The reference data is loaded into a set of processing elements, where all processing elements are attached in rows, where each row of processing elements corresponds to a row of reference data. The 8 byte search window data is then sequentially distributed through the rows of processing elements, and a sum of absolute errors between all elements of each row of search data and all elements of each row of reference data is calculated. The sum of absolute errors is the total magnitude of the differences between the search window data elements and the corresponding reference data elements.

Each processing element receives data from at most one other processing element, and transmits the data after adding a difference computed in the processing element to at most one other processing element, thus yielding little interaction between processing elements and little delay in calculations. Each processing element contains an absolute difference processor which subtracts the reference data from the search window data to determine the absolute difference between the reference data element and the search window element. Attached to each absolute difference processor is a summation component, which adds the error received from each preceding processing element to the error from the absolute difference processor. Each absolute difference data processor in a row of processors further contains a register for holding the total from the summation component, and the register of the last processing element in the row holds the sum of absolute error for the row.

Once the sum of absolute error is calculated for the row of processing elements, the absolute error for all rows of processing elements is totalled. Depending on the size of the reference, further addition of other processing element arrays may be required to compute a total sum of absolute error is calculated. This total sum of absolute error is monitored in a comparator and the search window address which gives the minimum SAE is converted into the motion vector.

Other objects, features, and advantages of the present invention will become more apparent from a consideration of the following detailed description and from the accompanying drawings.

DESCRIPTION OF THE PREFERRED EMBODIMENT

Figure 1:
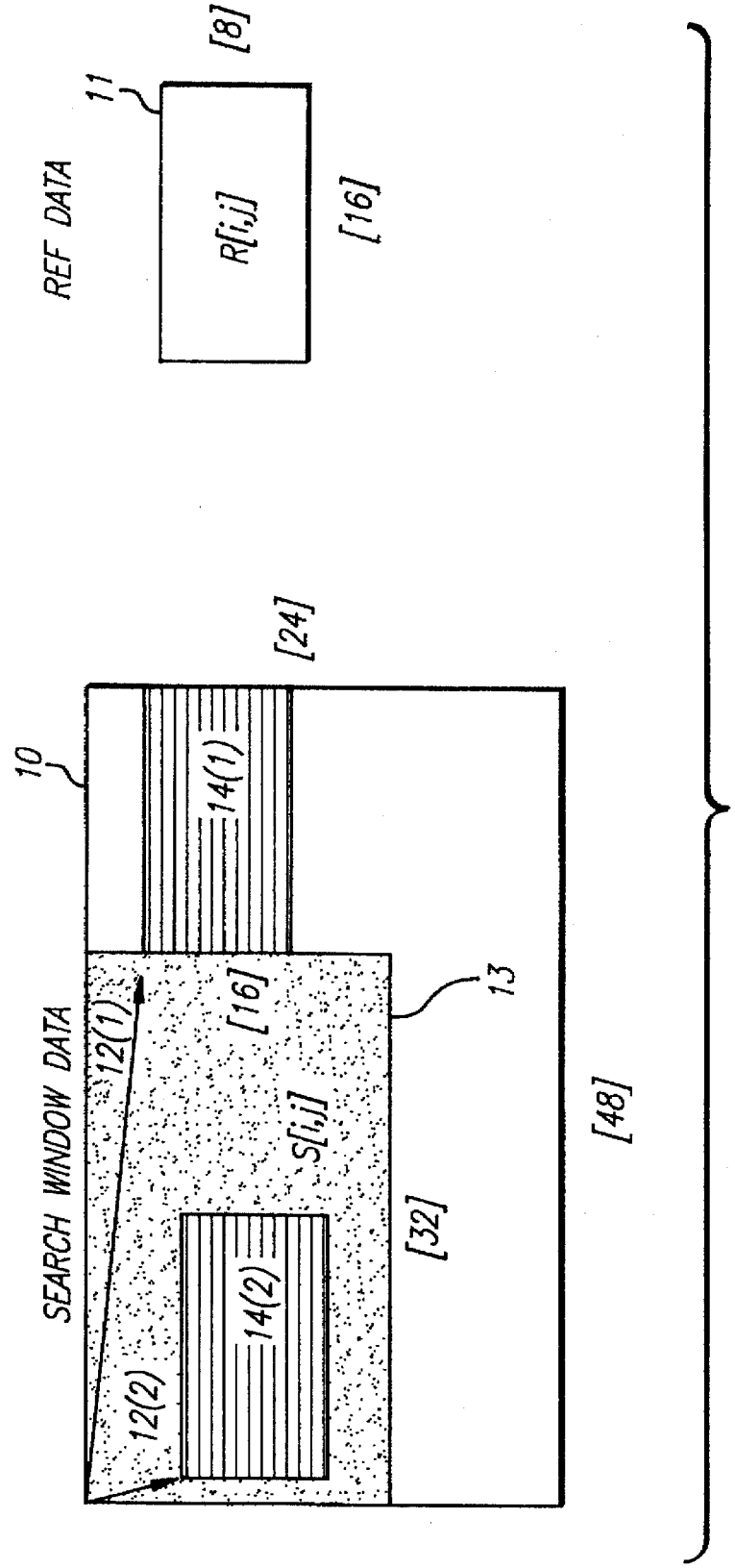
FIG. 1 shows the relationship between the search window data and the reference data.

FIG. 1 presents the search data window 10 for the present frame and the reference data 11 from the previous frame for use in a motion estimation processor. Reference data 11 is, for example, a 16×8 element block, while the search data window 10 is a 48×24 element block. Different sized reference data 11 and search data window 10 may be used based on the application, but the largest size reference data 11 presently contemplated for a 54 Mhz processor is 8 rows by 16 columns.

To determine the motion vector 12 best matching the data in search data window 10, all blocks in search window data 10 are compared with reference data 11, and a measure of distortion is computed for each matched block. The total number of matchings and sums of absolute error for full block matching is the number of different ways the reference data 11 can be aligned within search data window 10, as shown by darkened subwindow 13. Darkened subwindow 13 represents the possible locations motion vector 12 may extend into the search data window 10.

Two possible motion vectors, 12(1) and 12(2), are shown in search data window 10. Comparison block 14(1) is a portion of search window data 10 which is compared to reference data 11 during the full block search. If comparison block 14(1) is the closest match to the reference block 11, motion vector 12(1) will be used for the next frame prediction. If comparison block 14(2) were the closest match to reference block 11, however, motion vector 12(2) would instead be used for next frame prediction. A total of 512 comparisons are made, with 512 potential motion vectors for search window data 10 and reference data 11 having the dimensions as shown in FIG. 1. Architecture for computing the total sum of absolute error for a portion of search window data 10 is shown in FIGS. 2A, 2B, 2C and 3. For purposes of architecture discussion, the reference data will be presumed to have dimension 16×8, while search window data will be presumed to be divided into 24 rows of 48 columns each, in order to more easily illustrate architecture relationships to search window data 10.

Figure 2A:
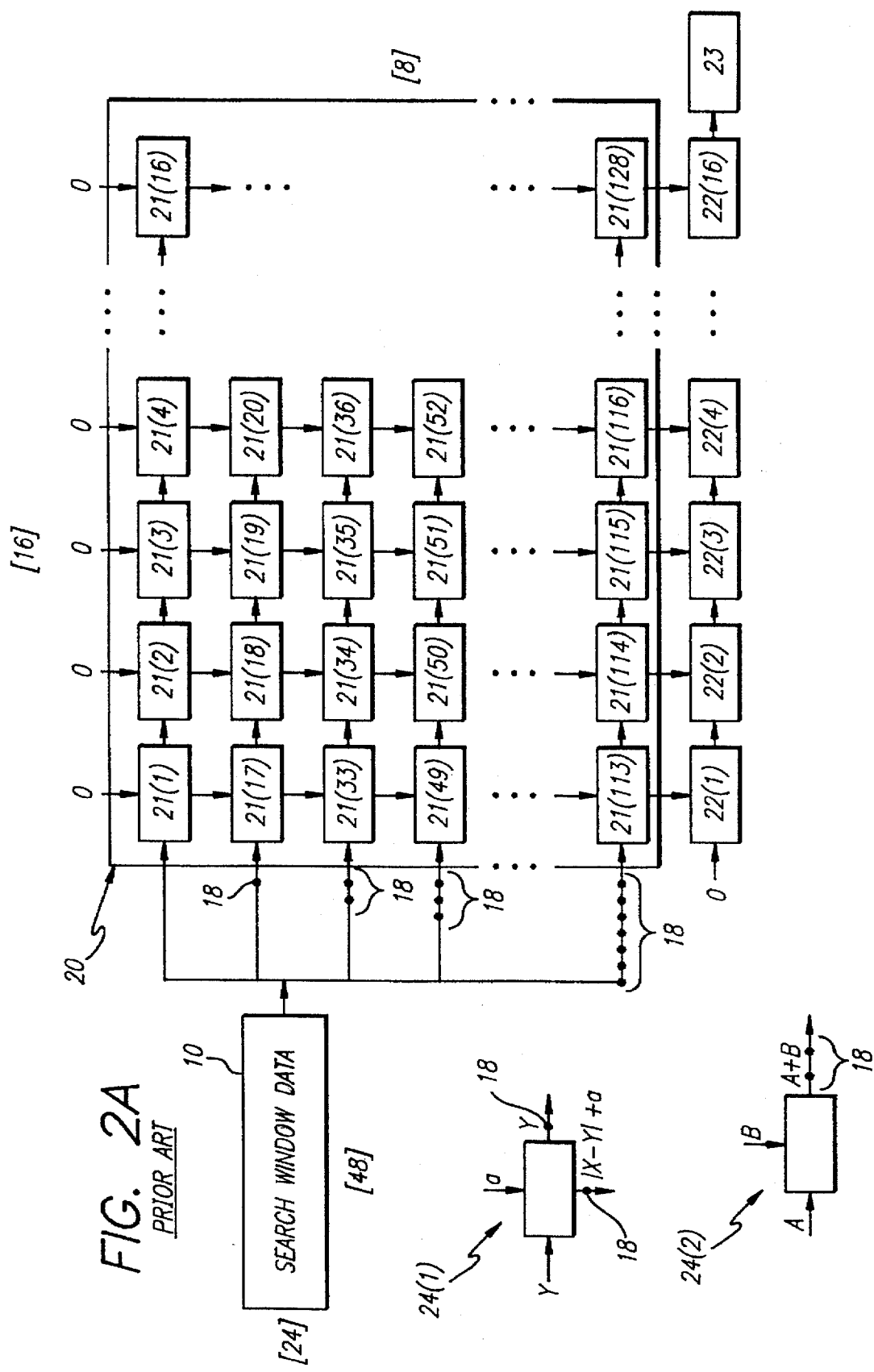
FIG. 2A illustrates the prior art systolic mesh array.

FIG. 2A presents the subject matter discussed in Jehng, et al., *An Efficient and Simple VLSI Tree Architecture for Motion Estimation Algorithms*, IEEE Transactions on Signal Processing, February, 1993, for a 16×8 processing array. The device sequentially maps the search window data 10 into a mesh processing array 20. The mesh processing array 20 includes a series of systolic processing elements 21(1) through 21(128). Data is fed directly into the first column of systolic processing elements 21(1), 21(17), 21(33), 21(49), 21(65), 21(81), 21(97), and 21(113). The input of data to the first column of individual systolic processors 21(1), 21(17), 21(33) . . . 21(113) is sequentially delayed by one clock cycle with respect to the data input of the preceding systolic processor. This delay is provided by a series of delay registers 18. Thus individual systolic processor 21(17) includes one delay register 18 in its input line to afford a one clock cycle delay with respect to the data input of individual systolic processor 21(1). Similarly individual the data input line for systolic processor 21(33) includes two delay registers 18 to afford a one clock cycle delay with respect to the data input for individual systolic processor 21(17). As further shown in FIG. 2A the data input line for individual systolic processor 21(49) includes three delay registers 18 to afford a one clock delay with respect to the data input for individual systolic processor 21(33). In the same manner each successive individual systolic processor in the first column of such processors includes an additional delay register 18 to afford a one clock cycle delay with respect to the preceding systolic processor until the last systolic processor in the first column, processor 21(113) has seven delay registers in its data input line.

Zero values are fed into each of the first row of individual systolic processing elements 21(1) through 21(16). Data is output from each of the last row of individual systolic processing elements 21(113) through 21(128) and into addition elements 22(1) through 22(16). Addition element 22(1) receives data from systolic processing element 21(113) and adds the value received to a zero value. Addition element 22(16) contains the sum of errors for the entire mesh processing array 20, and systolic mesh magnitude processing element 23 calculates the minimum of the 32 sums of absolute errors. Reference element 24(1) shows the operation of the individual systolic processing elements 21(1) through 21(128), which adds an upper component (a) to the magnitude of the difference between a reference data (X) and search window data or other previous data (Y). Output is therefore the sum |X−Y|+a, and Y. These outputs are also each delayed by a single clock cycle with the addition of delay registers 18. Reference element 24(2) shows how addition elements 22(1) through 22(16) operate, simply summing the two components received. The output of reference element 24(2) is further delayed two clock cycles with the addition of two delay registers 18 on the data output line of reference element 24(2).

The operation of the systolic array is as follows. During the first clock phase the first eight bytes of data are entered in the first processing element 21(1) in the first column of individual systolic processors, and into the first of the series of delay registers 18 for the remainder of the individual systolic processors in this column. In the next cycle the second eight bytes of search window data 10 are loaded into processing element 21(1) while the first eight bytes are loaded into the second systolic processor 21(17) of the first column of processors and also advanced one delay register 18 for the remainder of individual systolic processors 21(33), 21(49) ... 21(113) in the first column of processors. A subset of search window data 10 is sequentially loaded in this manner and the mesh array 21 operates on various levels of data until all search window data 10 has been loaded. A total of 32 SAE calculations are made within the 128 processing elements 21, and periodically output from addition element 22(16). These thirty-two SAEs represent motion vectors with a fixed Y coordinate. Interaction between each processing element 21(1) through 21(128) is with a maximum of three other adjacent processing elements, creating a layout problem due to the three way connection. The numerous delay registers in the array input also increase the difficulties.

Figure 2B:
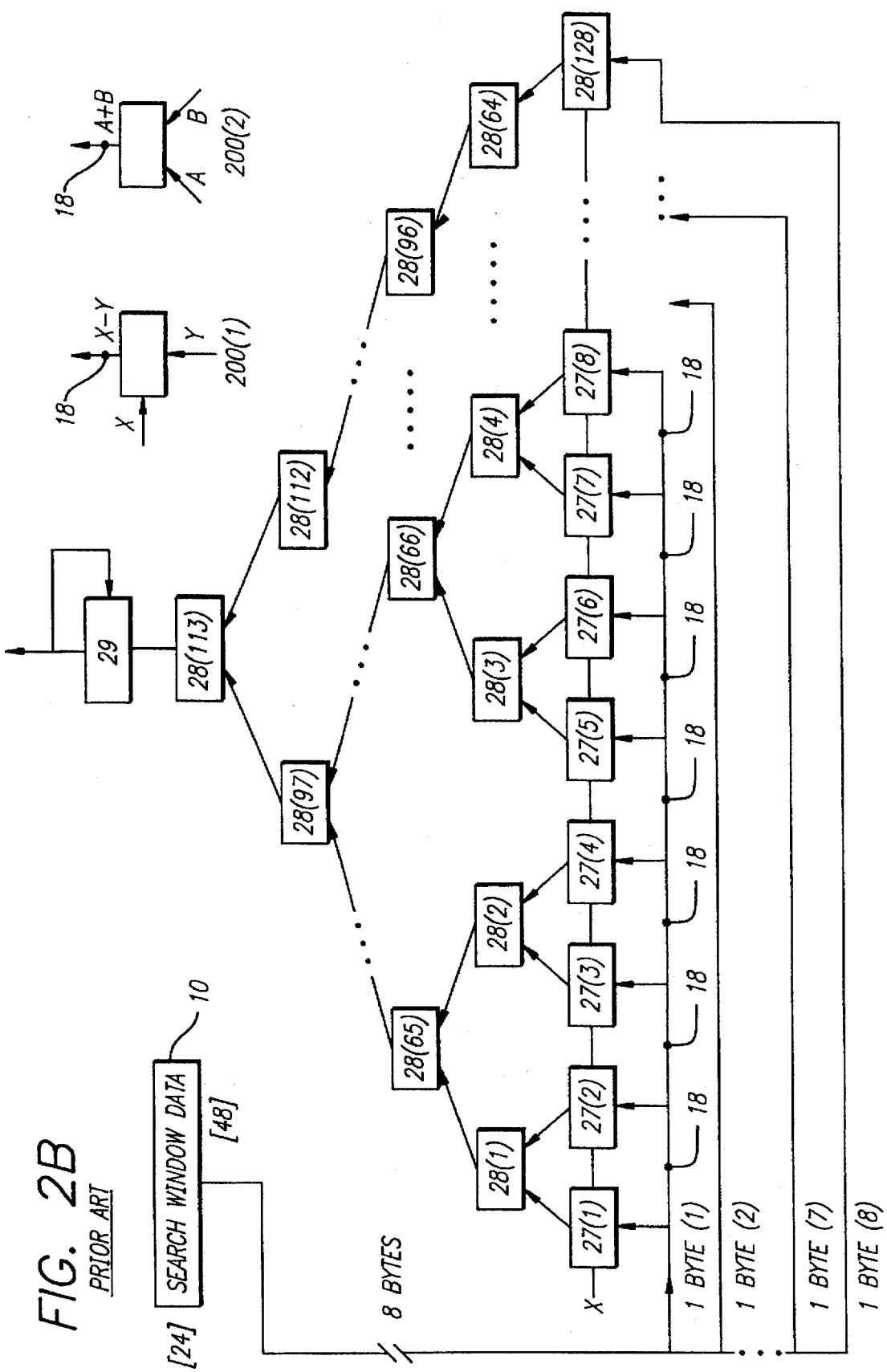
FIG. 2B shows a tree architecture for full search block matching algorithms.

FIG. 2B shows a tree architecture which avoids the problems of data interdependency. The processing element from the systolic mesh of FIG. 2A is decomposed into addition and difference elements so that both of them can operate simultaneously to speed up computations. One hundred twenty-eight reference pixels are assumed to have been preloaded into the difference blocks 27(1) through 27(128). Difference blocks 27(1) through 27(128) compute the differences between this reference data and the search window data. The differences are accumulated by a series of binary tree adders 28(1) through 28(64), 28(65) through 28(96), 28(97) through 28(112), and finally through binary tree adder 28(113). Tree magnitude processing element 29 calculates the minimum of the thirty-two sums of absolute errors. Reference elements 200(1) and 200(2) illustrate the performance of elements 27(1) through 27(16) and 28(1) through 28(15), respectively. Reference element 200(1) takes the difference of X and Y, and reference element 200(2) sums components A and B. Motion vector computation time and latency of the tree architecture are faster than the systolic mesh architecture of FIG. 2A, but VLSI implementation results in an irregular structure which takes relatively large area on a VLSI chip, requires processing elements which are as simple as possible and have high processing speed, and average data which can be processed per unit time is limited.

Figure 2C:
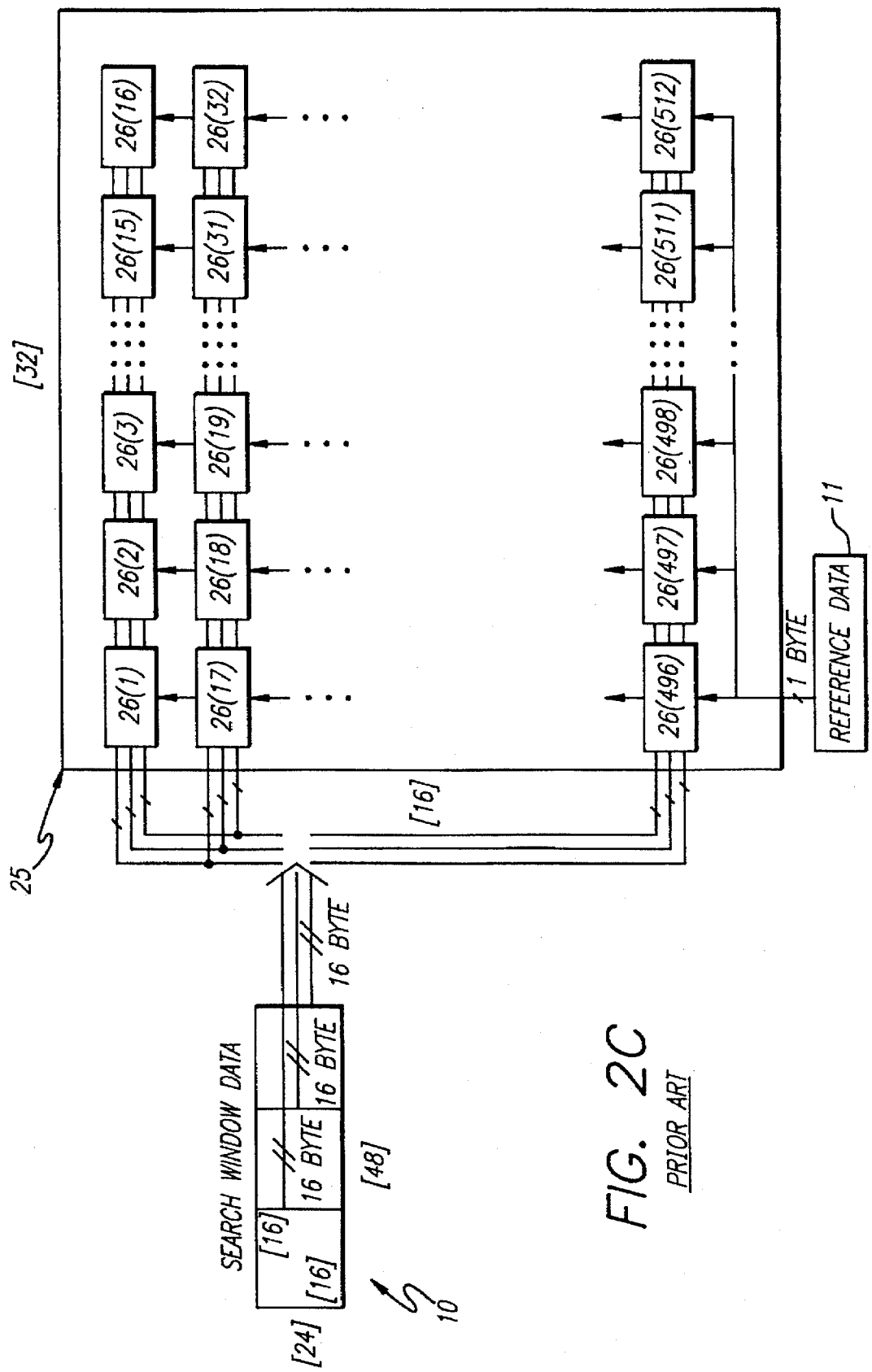
FIG. 2C is the architecture of a single 16-bit processing element, similar to the Yang reference architecture.

The architecture described in Yang, et al., *A Family of VLSI Designs for the Motion Compensation Block-Matching Algorithm*, IEEE Transactions on Circuits and Systems, October 1989, is shown in FIG. 2C. This architecture maps search window data 10 into a large processing element array 25 having dimensions 32×16, rather than the 16×8 array of the architecture of FIG. 2A. A single SAE is calculated within each of the 512 processing elements 26(1) through 26(512) in large processing element array 25. The search window 10 is divided into three subwindows having dimensions 16×16, and each subwindow is mapped across a 16 byte data line to the large processing element array 25. Each processing element 26(1) through 26(512) in large processing element array 25 receives one byte of reference data and three bytes of search window data each clock cycle, one byte of search window data from each of the three subwindows. After 128 clock cycles, each processing element has computed an individual SAE. Results are thus accessible after 128 clock cycles. In order to load all search window data 10 into the processing element array 25, however, sixteen bit word width is necessary to support data reading and manipulation. The advantage over the design of FIG. 2A is that the array layout is regular. The disadvantages of this device are the difficulty in reconfiguring the array to handle different sized reference windows (8×8, etc.) and the requirement to change the memory for different sized reference windows. Memory bandwidth also becomes critical, along with more congested wiring between the processor array and the memory.

Figures 3, 4:
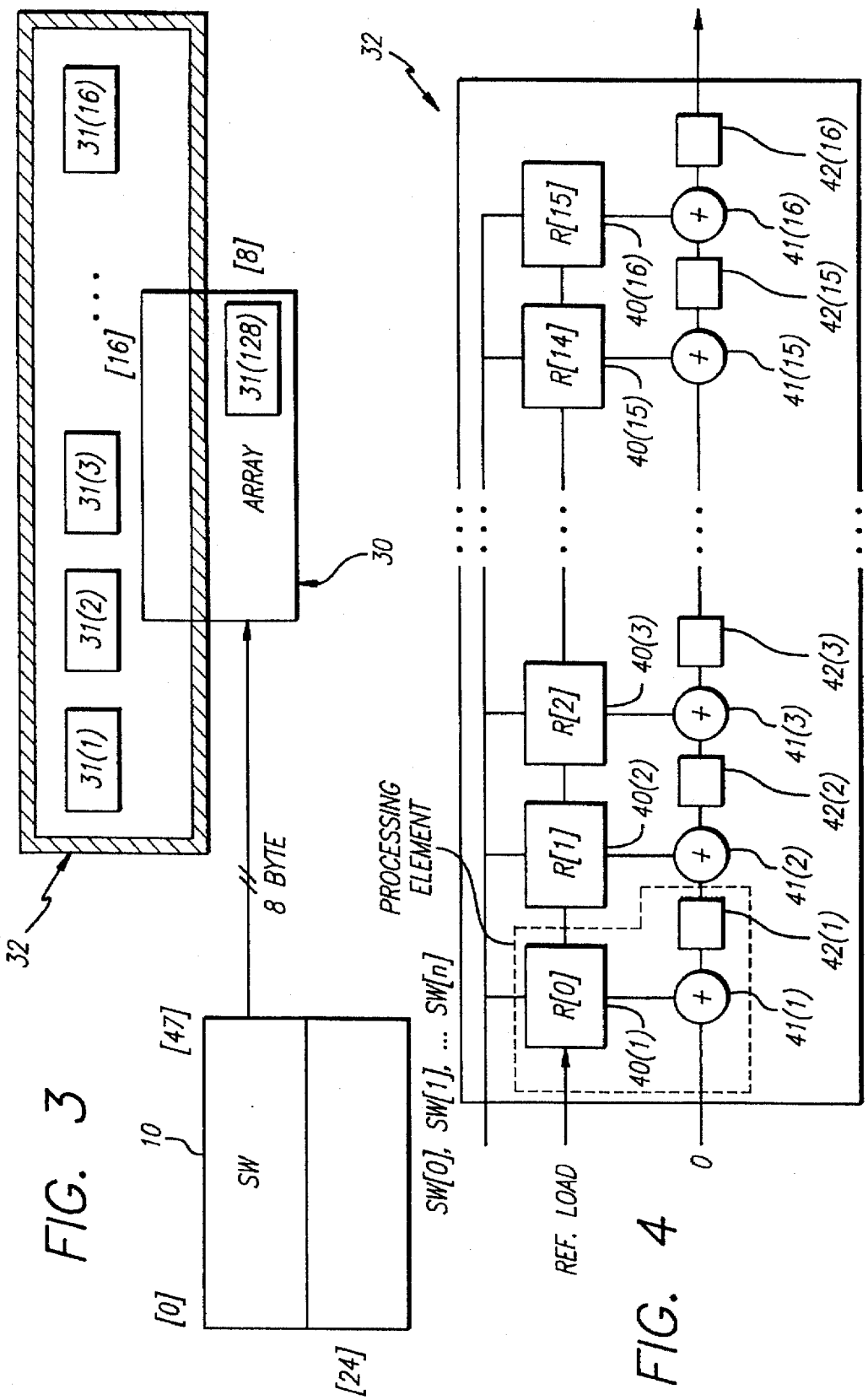
FIG. 3 graphically represents the architecture of the present invention.
FIG. 4 is the series architecture of a row of processing elements of the motion estimator circuit.

FIG. 3 shows a design capable of running at 54 Mhz. Search window data 10 is mapped into the processing element array 30, and processing elements 31(1) through 31(128) interact with only two, rather than four, other processing elements. Reference data 11 is loaded into processing element array 30, which then processes the data in rows and outputs a partial sum of the absolute errors between reference data 11 and search window data 10. Processor block 32 contains processing elements 31(1) through 31(16), which operates on only the top first row of reference data 11. The output of processing element array 30 is then the sum of absolute error.

FIG. 4 shows the structure within processor block 32. The top row of reference data 11 is loaded into absolute difference processors 40(1) through 40(16). This top row of reference data is loaded into absolute difference processor 40(1) and then shifted sequentially down through the absolute difference processors 40(2) through 40(16) using the reference load line. The reference data must be preloaded before starting processing computations. One byte of search window data 10 is then transmitted into the processor block globally to the sixteen absolute difference processors 40(1) through 40(16). The absolute difference for each set of search window data is calculated, where the absolute difference is the absolute value of the difference between a search window data element and a reference data element. While reference window data is loaded individually, element by element, into absolute difference processors 40(1) through 40(16), search window data is globally applied to absolute difference processors 40(1) through 40(16). In the first cycle, absolute difference processor 40(1) contains reference element R[0], which subtracts search window element SW[0]. In the second cycle, absolute difference processor 40(1) contains reference element R[0], which subtracts search window element SW[1]. This process is repeated for all 48 search window elements to compute 32 SAEs and 16 bogus data elements.

Once absolute difference processors 40(1) through 40(16) calculate the absolute differences, summation components 41(1) through 41(16) add the error received from respective absolute difference processors 40(2) through 40(16) to the error received from the previous registers 42(1) through 42(16). Summation component 41(1) adds the error from absolute difference processor 40(1) to a zero value. Summation components 41(1) through 41(16) then transmit data to registers 42(1) through 42(16), which accumulate error for all the relevant elements of search window data. Data on the sum of absolute differences for search window data is available from summation component 41(16). Thus, the value of the SAE received at the output of register 42(16) may be represented by the equation:

$$SAE = \{abs(R[0]-SW[i]) + abs(R[1]-SW[i]) + \ldots abs(R[15]-SW[i])\} \text{ where } i=0, 1, \ldots 15$$

As shown in FIG. 4, a single processing element consists of one absolute difference processor 40(n), one summation component 41(n), and one register 42(n), where n is 1 through 16.

The advantage of this design over previous designs is that the design of processing elements is regular, and therefore can be laid out on an ASIC extremely well. The connection between the processing element and the search window memory is simplified, and data width is smaller. The design of FIG. 2C requires more processing element-search window connections and larger data width.

Figure 5:
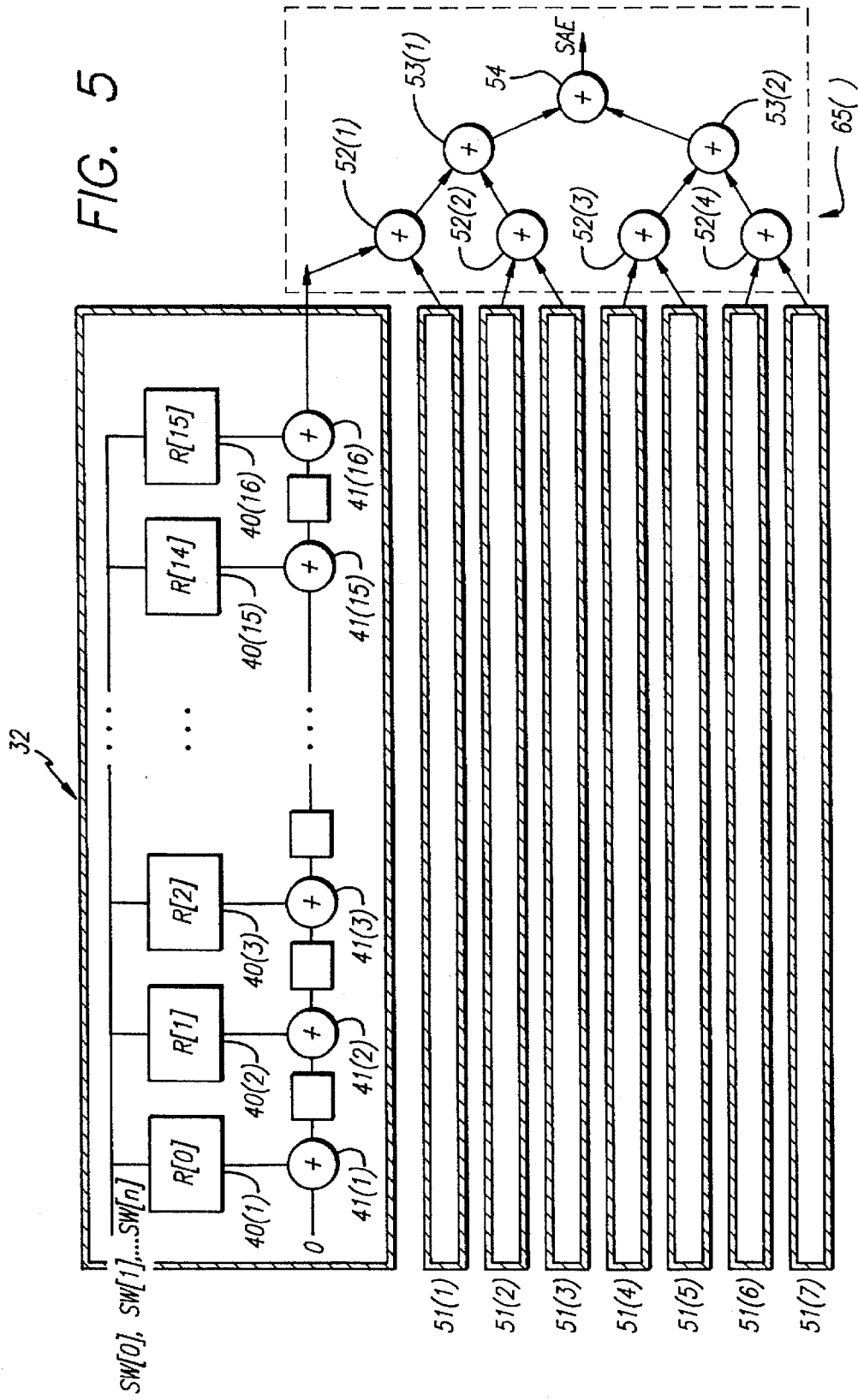
FIG. 5 represents the architecture of the entire 128 processing element architecture and the methodology used to compute the SAE.

FIG. 5 shows the implementation of processor block 32 of FIG. 4 and the summing mechanism for totalling the other seven rows of processor blocks 51(1) through 51(7). Additions are completed by first level tree adders 52(1) through 52(4), which sum two rows of data each. Second level tree adders 53(1) and 53(2) then each sum two of the four first level tree adder values, and third level tree adder 54 adds the values of the second level tree adders. Thus, at the output of third level tree adder 54, a sum of absolute error is available to be transmitted.

Figure 6:
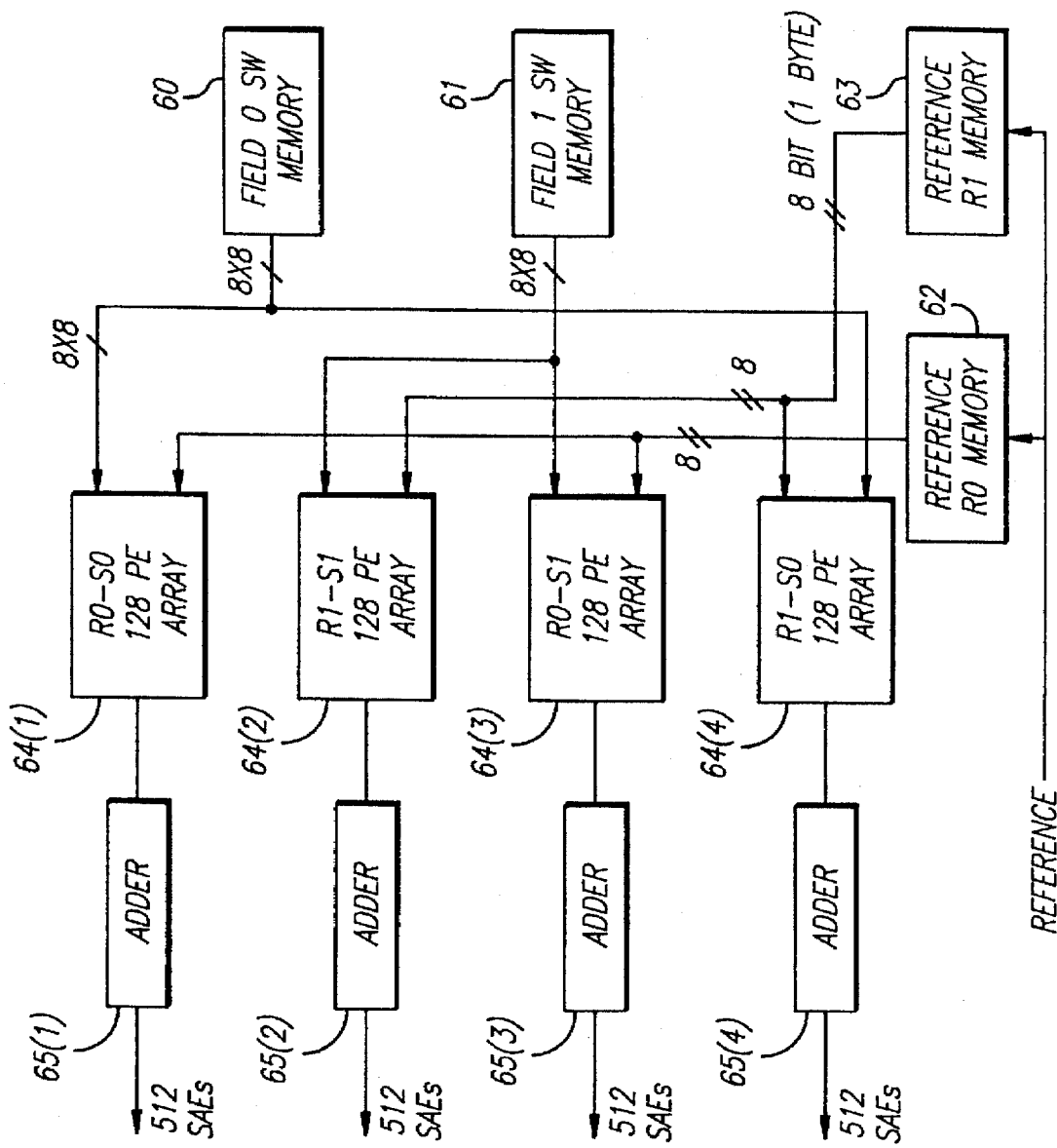
FIG. 6 shows the relationship between the blocks of processing elements, the search window memory, reference data memory, and the adder arrays in an application.

FIG. 6 shows the implementation as contemplated for the present design, called the MPEG 2 motion estimator. Several ways to implement the design may be implemented by those skilled in the art of circuit implementation, but the results produced must be the same. Search window data 10 is available and stored as field 0 and field 1 search window memory elements 60 and 61. Field 0 and field 1 search window memory elements 60 and 61 contain 64×24 bytes of data each. Reference data 11 is loaded into reference memory R0 62 and reference memory R1 63, both of which are 128 byte arrays. Data is then made available to processing blocks 64(1) through 64(4) by 8 bit words. Processing block 64(1) accesses field 0 search window memory element 60 and reference memory R0 62 to determine the sum of absolute error between those two blocks of data. Processing block 64(2) processes field 1 search window memory element 61 and reference memory R1 63; processing block 64(3) processes field 1 search window memory element 61 and reference memory R0 62; and processing block 64(4) processes field 0 search window memory element 60 and reference memory R1 63. SAEs calculated within the processing elements are then transmitted to tree adders 65(1) through 65(4) for totalling. Totals from tree adders 65(1) and 65(2) are each 512 same parity SAEs, and totals from tree adders 65(3) and 65(4) are each 512 opposite parity SAEs. Tree adders 65(1) through 65(4) may be Wallace adders. Memories 60 through 63 should be double buffered so that while data is read from memories 60 through 63, data for the next computation can be loaded.

Figure 7:
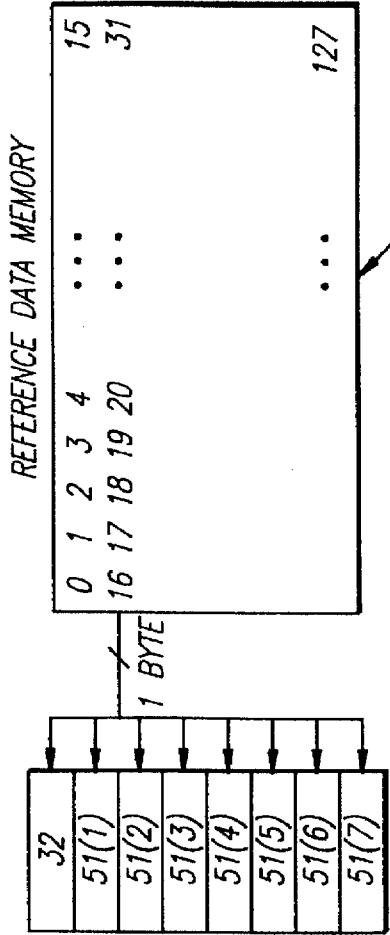
FIG. 7 shows the control signal to load reference data into the 128 processing elements.

FIG. 7 shows the control signal to load reference data into the 128 processing elements. Reference data 70 is divided into sixteen rows of eight bytes per row. Reference data 70 is sequentially read byte by byte and shifted into the eight rows of processor blocks 32 and 51(1) through 51(7). During the first sixteen clock cycles, cycles 0 through 15, the first row of reference data memory 70 is sequentially shifted into processor block 32. As shown in FIG. 4, the first element of the first row of reference data memory 70 is shifted into absolute difference processor 40(1) during the first clock cycle, the second element of the first row of reference data memory 70 is shifted into absolute difference processor 40(2) during the second clock cycle, and so on. During the second sixteen clock cycles, cycles 16 through 31, the second row of reference data memory 70 is sequentially shifted into processor block 51(1). This sequence continues through the last sixteen clock cycles, cycles 114 through 127, where the last row of reference data memory 70 is sequentially shifted into processor block 51(7). Data is shifted from reference data memory 70 into processor blocks 32 and 51(1) through 51(7) across a single eight bit data line.

Figure 8:
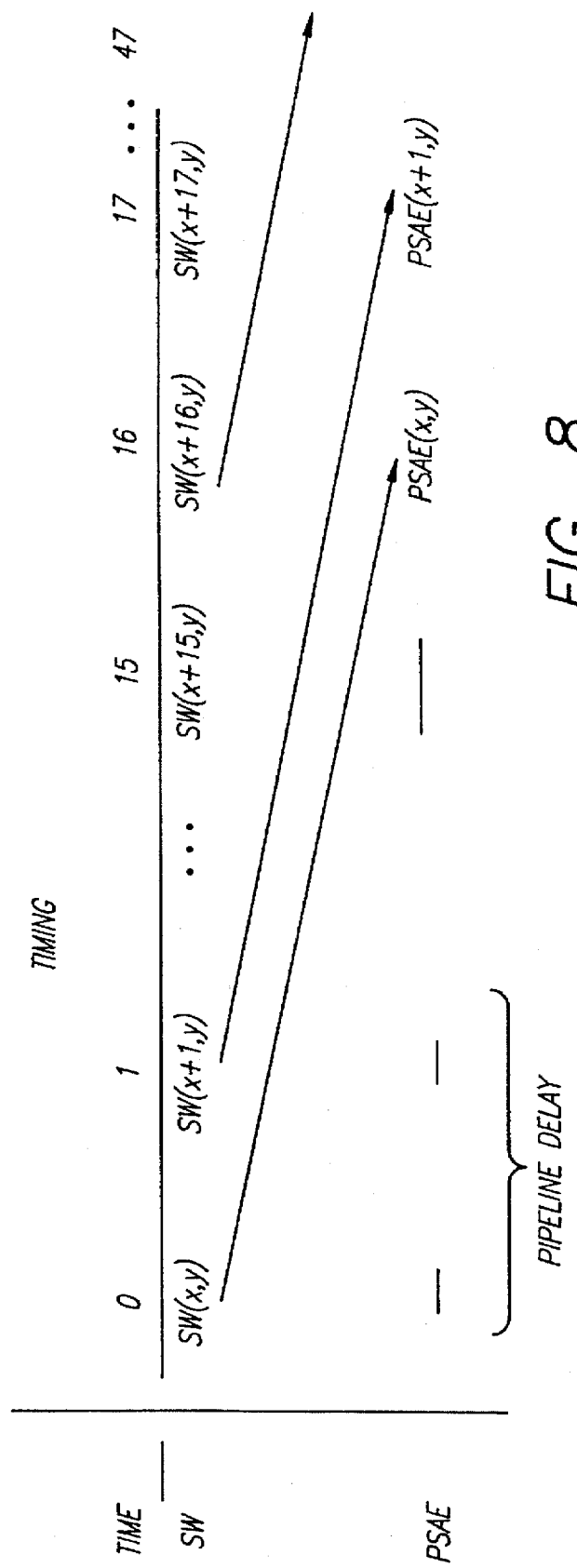
FIG. 8 illustrates the timing involved in loading one row of search data and calculating the partial SAEs.

FIG. 8 illustrates the timing involved in sending search window data to the processing elements and calculating the partial SAEs. Search window data corresponding to the first element of the search window is loaded into processor block 32 during the initial cycle, having coordinates or memory address equivalents (x, y). The search window data is globally distributed, that is, into absolute difference processors 40(1) through 40(16), for performing a calculation. No partial SAE is calculated during this cycle which would otherwise produce inaccurate data. During the second cycle, search window data having coordinates (x+1, y) is loaded into the processor block 32. The remainder of the 48 total elements of the search window are loaded into the array. In order to obtain the partial SAE, a pipeline delay in calculating the partial SAE occurs and thus data is not available from the register of summation component 41(16) for 16 cycles. At the 16th cycle, a partial SAE data corresponding to motion vector (x, y) is available at the register of summation component 41(16). For the 48 pixels of search window data in each row of search window data, 48 cycles are necessary to load the data and a total of 48 cycles are required to calculate all 32 partial SAE's for the 48 element search window due to the pipeline delay.

Figure 9:
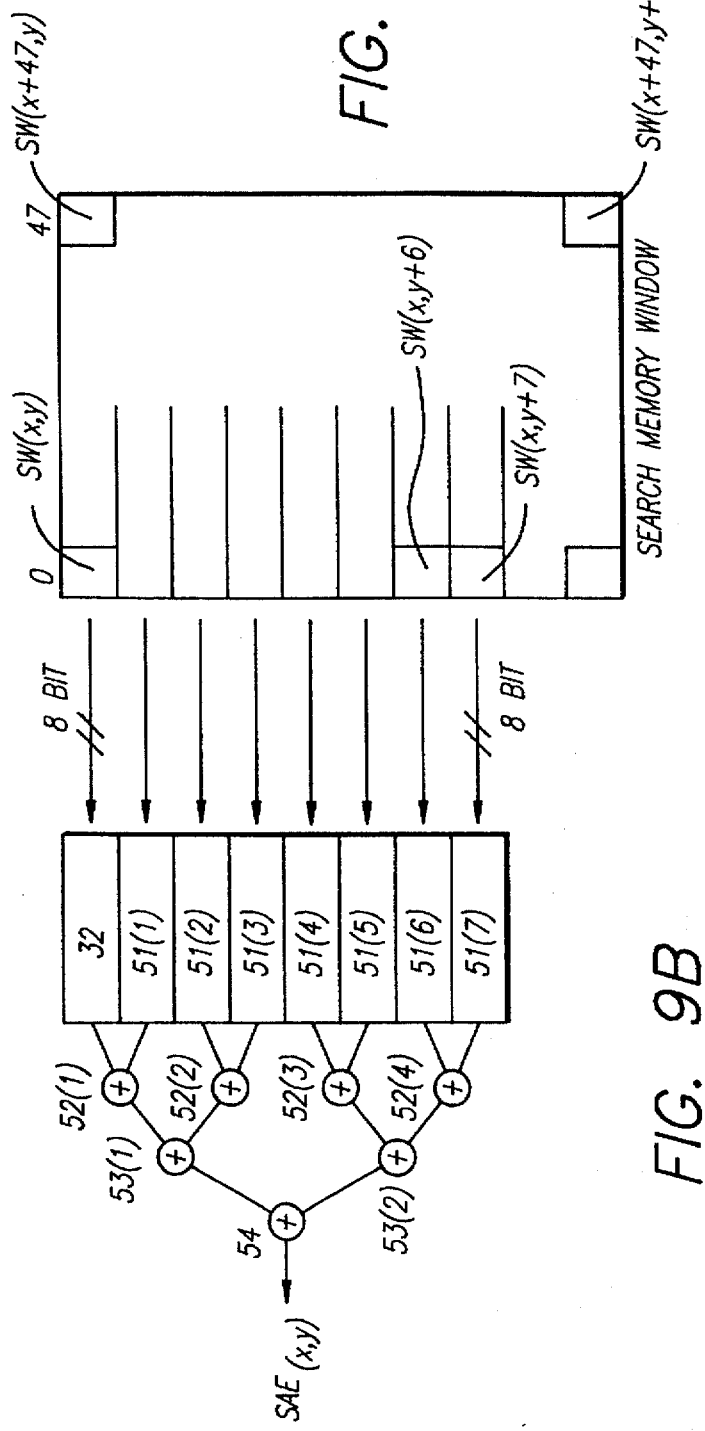
FIG. 9A illustrates the mapping of search window data into the processing array element.
FIG. 9B presents a tabular representation of the mapping of search window data into the processing array element for each cycle in the procedure.

FIG. 9A and FIG. 9B illustrate the way search window data is mapped into the processing element array and the eight rows of processor blocks 32 and 51(1) through 51(7)

shown in FIG. 5. The 48 elements of the first row of search window data are mapped into processor block 32 as illustrated in FIG. 8. The 48 elements of the second row of search window data are mapped into processor block 51(1), and so on. During the first cycle, search window elements (x, y) through (x, y+7) (eight bytes) are transmitted to the eight processor blocks 32 and 51(1) through 51(7). During the second cycle, search window elements (x+1, y) through (x+1, y+7) are transferred to the eight processor blocks 32 and 51(1) through 51(7). During the 48th cycle, search window elements (x+47, y) through (x+47, y+7) are mapped into the eight processor blocks 32 and 51(1) through 51(7). The first SAE is available at the 16th cycle. A total of 32 SAEs are calculated and summed using first level tree adders 52(1) through 52(4), second level tree adders 53(1) and 53(2) and third level tree adder 54. This process is repeated for additional search window data, where search window data elements (x, y+1) through (x, y+8) are input to the eight processor blocks 32 and 51(1) through 51(7). A second set of 32 SAEs is calculated, numbered SAE(x, y+1) through SAE(x+31, y+1). The process is repeated sixteen times to calculate a total of 512 SAEs. While search window data is 48 by 24, only 48 by 16 is used to calculate the SAEs, and the remaining 48 by 8 is discarded. Sixteen sets of 32 SAEs are therefore calculated for the entire search window.

Figure 10:
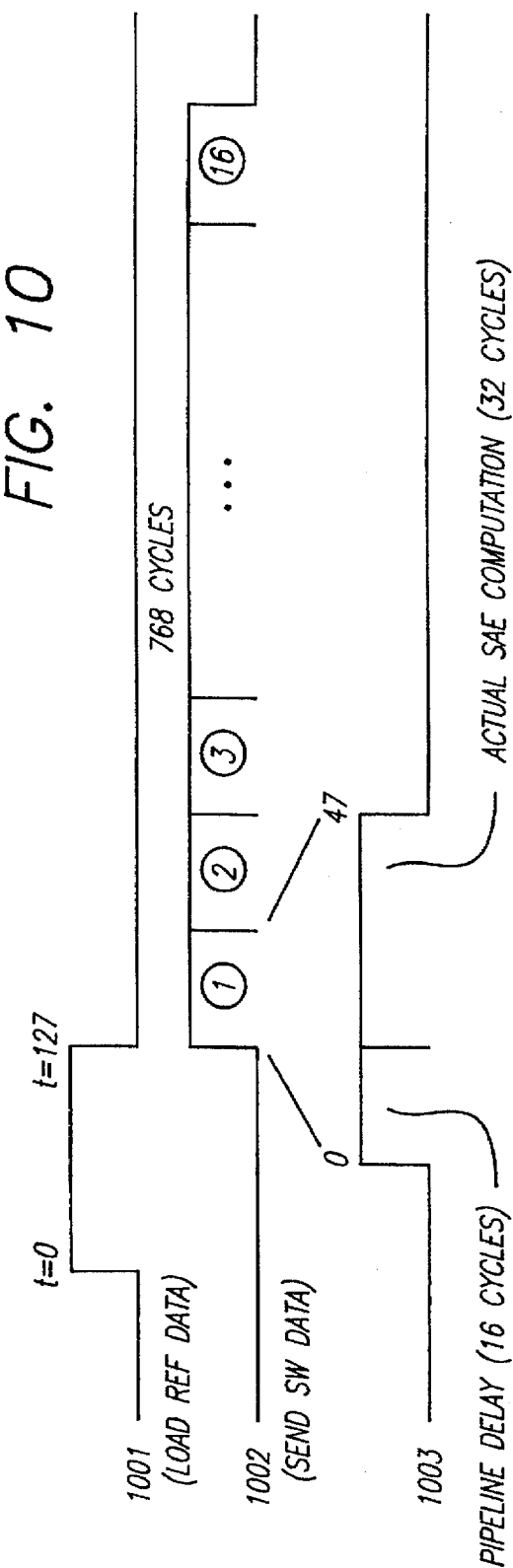
FIG. 10 is an overview of the timing of the necessary operations to calculate a 32 by 16 SAE.

FIG. 10 is an overview of the timing of the necessary operations to calculate 32 by 16 SAE's. For a 16×8 element processing array, reference data is initially loaded during the initial period 1001 which requires 128 cycles. After reference data has been loaded, search window data is loaded and partial SAEs are computed a total of 16 times during the final period 1002. The first 16 cycles of each calculation period 1003 used to calculate a partial SAE are for search window data loading and the necessary pipeline delay and the final 32 cycles of each calculation period 1003 is for the actual computation of the SAE. Thus the final period 1002 requires a total of 768 clock cycles. This allows computation of SAE's in the range of 32 horizontal by 16 vertical.

Figure 11:
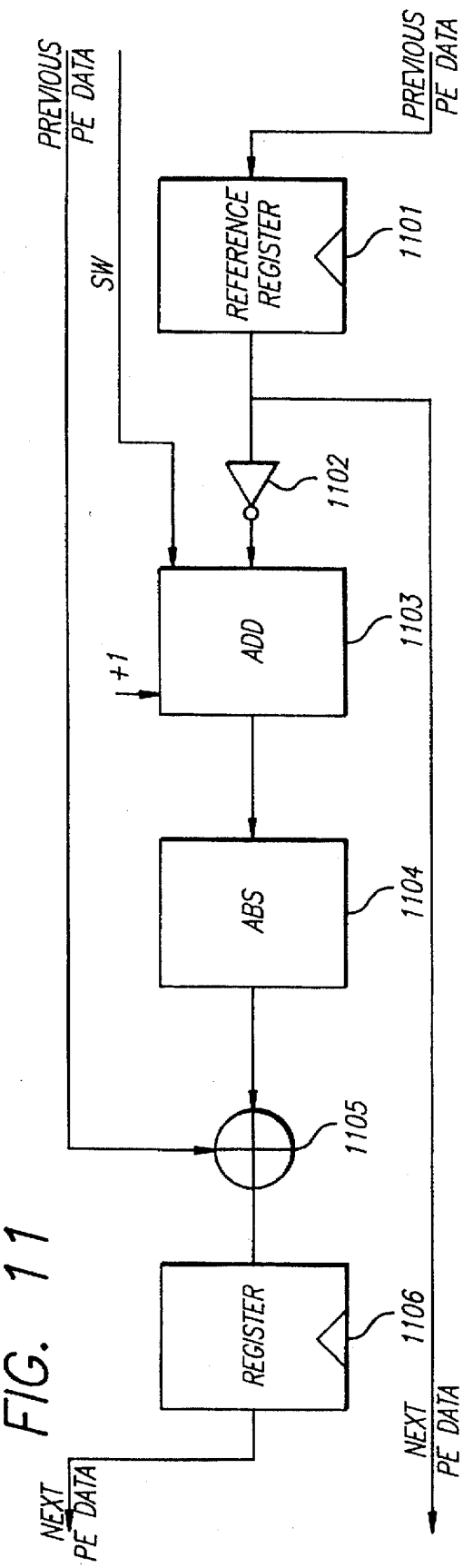
FIG. 11 represents an overview of the implementation of an individual processing element.

An overview of the implementation of an individual processing element is shown in FIG. 11. Internal register 1101 receives input from the previous processing element register. Reference data in internal register 1101 is inverted using inverter 1102 which inverts the sign of the reference data. Adder 1103 sums the inverted reference data and search window data and absolute value is calculated in absolute value element 1104. The absolute value or magnitude of the difference between the reference data and the search window data is then added to the output from the previous processing element and stored in present processing element register 1106. Data from internal register 1101 is made available to the next processing element, as is data from present processing element register 1106.

Figure 12:
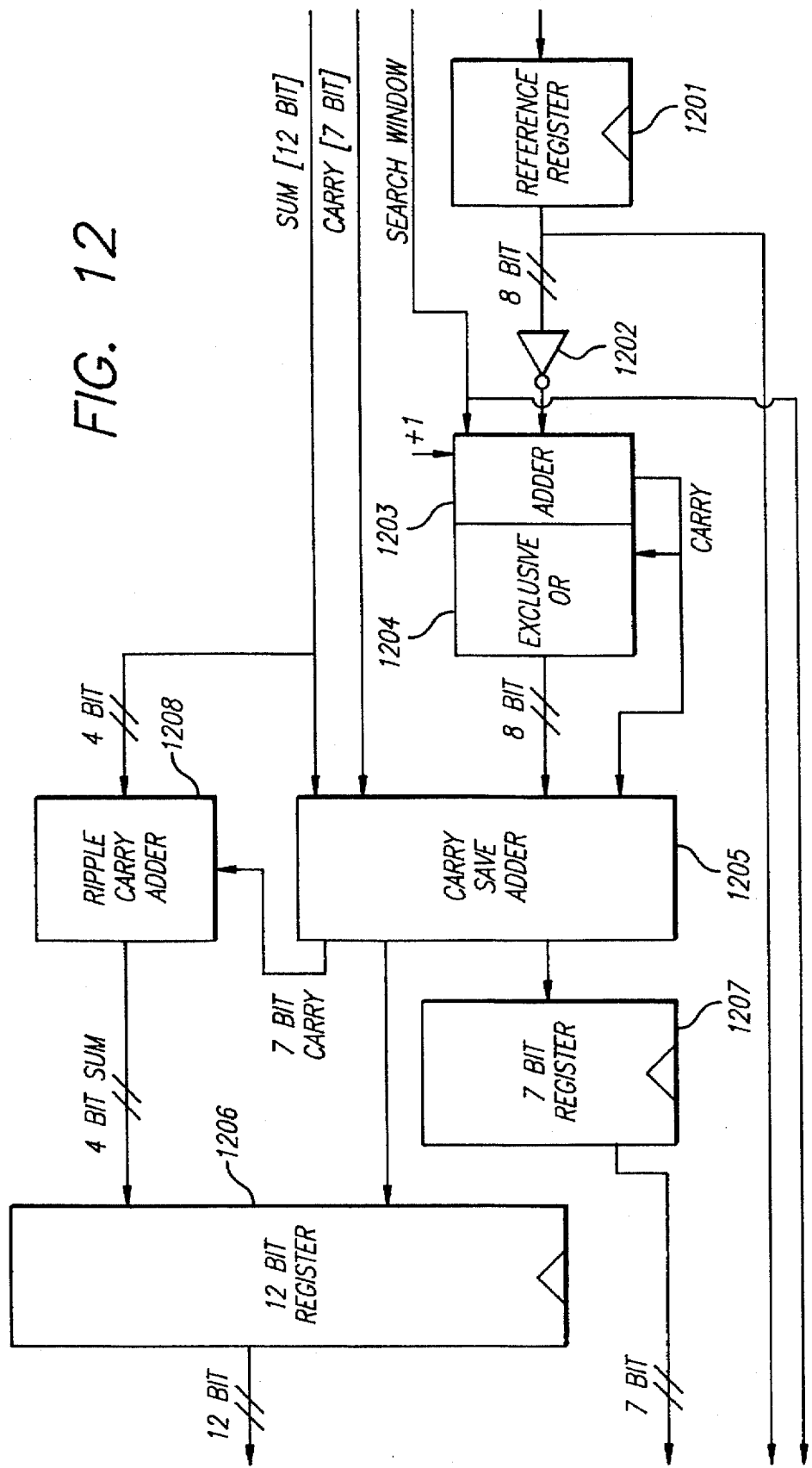
FIG. 12 shows the actual implementation of the processing element.

FIG. 12 shows the actual implementation of the processing element. The individual elements are known in the art and are provided to illustrate the preferred implementation of the invention, but other implementations may be employed. Data available is search window data, 7 bit carry data, and 12 bit sum data. Reference leg 1201 receives data from the previous processing element and transmits 8 bit data to inverter 1202, which inverted all bits to perform subtraction with adder 1203. Adder 1203 adds eight bit data from inverter 1202 to search window data and carries the data to exclusive or element 1204. The exclusive or element 1204 calculates the absolute value of the data received from the adder 1203. Carry save adder 1205 receives the 7 bit carry data and the 12 bit sum data and outputs the result to twelve bit register 1206 and seven bit register 1207, as well as transmitting the most significant bit to ripple carry adder 1208 to compensate for values larger than 7 bit registers handle. Ripple carry adder 1208 also receives the upper 4 bits of the 12 bit sum from the previous processing element. Output of ripple carry adder 1208 is the four bit sum which is transmitted to twelve bit register 1206. Again, eight bit data from reference element 1201 is made available to the following processor element.

While the invention has been described in connection with specific embodiments thereof, it will be understood that the invention is capable of further modifications. This application is intended to cover any variations, uses or adaptations of the invention following, in general, the principles of the invention, and including such departures from the present disclosure as come within known and customary practice within the art to which the invention pertains.

What is claimed is:

1. A full search block matching motion estimator circuit for calculating a total sum of absolute error comprising:

means for determining a search window, said search window having a set of search window data associated therewith;

means for selecting a reference block, said reference block having a set of reference data associated therewith;

a first means for partitioning the search window data into a plurality of rows and columns;

a second means for partitioning the reference dam into a plurality of rows and columns;

a plurality of non-interacting sets of sequentially arranged interacting processing elements, wherein each sequentially arranged processing element individually computes an absolute error between each element of each row of search data and each element of each row of reference data and said sets of processing elements sequentially pass data from a first processing element to a final processing element, said final processing element containing a sum of absolute errors equal to a total magnitude of the differences between search window data values and corresponding reference data values for a particular set of processing elements; and means for transmitting the total magnitude from each particular set of processing elements, to a plurality of separate adder arrays, wherein the plurality of adder arrays determine the total sum of absolute error:

wherein each processing element comprises:

an absolute difference processor which subtracts the reference data from the search window data to determine an absolute difference between the reference data element and the search window element;

a summation component which adds the error received from each preceding processing element and the error from the absolute difference processor; and a register for holding the total from the summation component, wherein the register of the last summation component in the row holds the sum of absolute error for the row.

2. The full search block matching motion estimator circuit of claim 1, wherein the plurality of sets of sequentially arranged interacting processing elements comprise a plurality of processing elements connected together in parallel rows, and each row of processing elements corresponds to a row of reference data.

3. The full search block matching motion estimator circuit of claim 1, wherein the number of processing elements in each row equals the number of columns of reference data.

4. The full search block matching motion estimator circuit of claim 1, wherein the total number of processing elements is equal to the dimensions of the reference block.

5. The full search block matching motion estimator circuit of claim 4, wherein the reference data has eight rows and sixteen columns, and the number of processing elements in each row is sixteen, and the total number of processing elements is 128.

6. The full search block matching motion estimator circuit of claim 1, wherein the loading means comprise:
   means for obtaining a row of reference data having an eight-bit word length; and
   means for distributing each reference data element in each row to the processing element corresponding to the reference data element in the row.

7. The full search block matching motion estimator circuit of claim 6, wherein the sequential distribution means comprise:
   means for obtaining search window data having an eight-bit word length; and
   means for distributing all elements of all rows of search window data globally throughout each row of corresponding processing elements.

8. The full search block matching motion estimator circuit of claim 1, wherein:
   each processing element receives data from up to one preceding processing elements; and
   each processing element transmits data to up to one subsequent processing elements.

9. The full search block matching motion estimator circuit of claim 1, wherein the absolute difference processor consists of an inverter which inverts reference data from the register of previous processing elements, an adder which adds data received from said inverter to search window data, and an absolute value element which computes magnitude of the output from said adder.

10. The full search block matching motion estimator circuit of claim 9, wherein the summation component consists of a carry save adder and a ripple carry adder.

11. The full search block matching motion estimator circuit of claim 10, wherein the register consists of a twelve bit data register and a seven bit data register.

12. The full search block matching motion estimator circuit of claim 11, wherein the ripple carry adder outputs data only to the twelve bit data register.

13. A full search block matching circuit for calculating a total sum of absolute error in a motion estimator comprising:
   a plurality of non-interacting rows of sequentially arranged interacting processing elements;
   means for loading a row of reference data into a row of processing elements;
   means for calculating a sum of absolute error between each row of reference data and a corresponding row of search window data in each row of processing elements by performing a subtraction of reference data and search window data and passing the results of said subtractions sequentially through said sequentially arranged interacting processing elements; and
   means for totalling the sum of absolute error calculated in each row of sequentially arranged interacting processing elements; wherein each processing element comprises:
   an absolute difference processor which subtracts one element of reference data from one element of search window data each clock cycle to determine an absolute difference between the reference data element and the search window element;
   a summation component which adds the error received from each preceding processing element and the error from the absolute difference processor, and
   a register for holding the total from the summation component, wherein the register of the last summation component in the row holds the sum of absolute error for the row.

14. The full search block matching circuit for calculating a total sum of absolute error in a motion estimator of claim 13, wherein the calculating means comprise a plurality of rows of processing elements.

15. The full search block matching circuit for calculating a total sum of absolute error in a motion estimator of claim 14, wherein the loading means comprise:
   means for obtaining a row of reference data having an eight-bit word length;
   means for distributing each reference data element in each row to the processing element corresponding to the reference data element in the row;
   means for obtaining search window data having an eight-bit word length; and
   means for distributing all elements of all rows of search window data globally throughout each row of corresponding processing elements.

16. The full search block matching motion estimator circuit of claim 14, wherein:
   each processing element receives data from up to one preceding processing elements; and
   each processing element transmits data to up to one subsequent processing elements.

17. The full search block matching motion estimator circuit of claim 13, wherein the absolute difference processor consists of an inverter which inverts reference data from the register of previous processing elements, an adder which adds data received from said inverter to search window data, and an absolute value element which computes magnitude of the output from said adder.

18. The full search block matching motion estimator circuit of claim 17, wherein the summation component consists of a carry save adder and a ripple carry adder.

19. The full search block matching motion estimator circuit of claim 18, wherein the register consists of a twelve bit data register and a seven bit data register.

20. A full search block matching circuit for use in calculating a total sum of absolute error in a motion estimator comprising:
   a plurality of non-interacting sets of sequentially arranged interacting processing elements for calculating the absolute error between each set of reference data and a corresponding set of search window data, each of said sets of sequentially arranged interacting processing elements passing data from a first processing element in the set through all processing elements in the set to a last element in the set; and
   means for summing the absolute differences calculated within each set of sequentially arranged interacting processing elements; wherein the plurality of rows of processing elements comprise:
   a plurality of rows of absolute difference processors, wherein each absolute difference processor subtracts one element of reference data from one element of search window data to determine an absolute difference between the reference data element and the search window element;

a plurality of summation components, wherein each summation component is attached to each absolute difference processor and adds the error received from each preceding processing element to the error from the absolute difference processor; and a plurality of registers, wherein each register holds the total from the summation component and the register of the last summation component in the row holds the sum of absolute error for the row.

21. The full search block matching circuit for use in calculating a total sum of absolute error in a motion estimator of claim 20, wherein the retrieving means comprise:

means for obtaining a row of reference data having an eight-bit word length;

means for distributing each reference data element in each row to the processing element corresponding to the reference data element in the row;

means for obtaining search window data having an eight-bit word length; and means for distributing all elements of all rows of search window data globally throughout each row of corresponding processing elements.

22. The full search block matching motion estimator circuit of claim 20, wherein:

each processing element receives data from up to one preceding processing elements; and each processing element transmits data to up to one subsequent processing elements.

23. A method for calculating a total sum of absolute errors between an M×N reference block and a jM×kN search window, where j, k, M, and N are positive nonzero integers, comprising the steps of:

receiving data having dimensions 1×N from the reference block;

subtracting corresponding search window data of dimension 1×N from the 1×N dimensional reference data to determine a 1×N dimensional array of absolute differences;

holding the results of the subtraction step;

sequentially adding the result from each of the N subtraction steps to the result from the N−1 holding step to determine a sum of absolute error; and repeating the preceding steps M times and totalling the resulting sum of absolute error.

24. The method for calculating the total sum of absolute errors of claim 23, wherein M and N are multiples of 4.

25. The method for calculating the total sum of absolute errors of claim 24, wherein the reference data is 16 by 8 and the search window is 48 by 24.

* * * * *